United States Patent
Higashigawa et al.

(10) Patent No.: US 7,663,872 B2
(45) Date of Patent: Feb. 16, 2010

(54) SLIDING MECHANISM FOR PORTABLE ELECTRONIC DEVICE

(75) Inventors: Hisashi Higashigawa, Higashiyamato (JP); Yasushi Komine, Hino (JP); Akira Watanabe, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 93 days.

(21) Appl. No.: 12/148,975

(22) Filed: Apr. 24, 2008

(65) Prior Publication Data

US 2009/0147485 A1 Jun. 11, 2009

(30) Foreign Application Priority Data

Dec. 7, 2007 (JP) ............................ P2007-317508

(51) Int. Cl.
*H05K 7/00* (2006.01)
(52) U.S. Cl. .............................. 361/679.26; 361/679.02; 361/747; 455/550.1; 455/575.4; 379/433.12; 379/446
(58) Field of Classification Search ............ 361/679.02, 361/679.06, 679.09, 679.26, 679.15, 747
See application file for complete search history.

(56) References Cited

U.S. PATENT DOCUMENTS

| | | | | |
|---|---|---|---|---|
| 6,785,565 | B2 * | 8/2004 | Gventer | 455/575.4 |
| 7,463,913 | B2 * | 12/2008 | Nagashima | 455/575.4 |
| 2003/0064688 | A1 * | 4/2003 | Mizuta et al. | 455/90 |
| 2007/0091555 | A1 * | 4/2007 | Lee | 361/683 |
| 2007/0270180 | A1 * | 11/2007 | Takagi | 455/550.1 |
| 2008/0062656 | A1 * | 3/2008 | Kim | 361/747 |
| 2008/0161075 | A1 * | 7/2008 | Kim et al. | 455/575.4 |
| 2009/0029749 | A1 * | 1/2009 | Lee | 455/575.4 |
| 2009/0135555 | A1 * | 5/2009 | Komine et al. | 361/679.26 |

FOREIGN PATENT DOCUMENTS

| | | |
|---|---|---|
| JP | 2005-167306 A | 6/2005 |
| JP | 2006-128808 A | 5/2006 |
| JP | 2006-245347 A | 9/2006 |
| JP | 2006-333079 A | 12/2006 |

* cited by examiner

*Primary Examiner*—Jayprakash N Gandhi
*Assistant Examiner*—Courtney Smith
(74) *Attorney, Agent, or Firm*—Frishauf, Holtz, Goodman & Chick, P.C.

(57) ABSTRACT

A sliding mechanism includes: a slidable intermediate member having first and second guide holes; a first shaft that is slidably inserted into the first guide hole, the first shaft having first and second end portions; a first spring member that is interposed between the first end portion of the first shaft and the slidable intermediate member to urge the slidable intermediate member toward the second end portion of the first shaft; a second shaft that is slidably inserted into the second guide hole, the second shaft having third and fourth end portions, the third end portion being disposed at a position opposite to the first end portion; and a second spring member that is interposed between the third end portion of the second shaft and the slidable intermediate member to urge the slidable intermediate member toward the fourth end portion of the second shaft.

5 Claims, 5 Drawing Sheets

FIG. 4
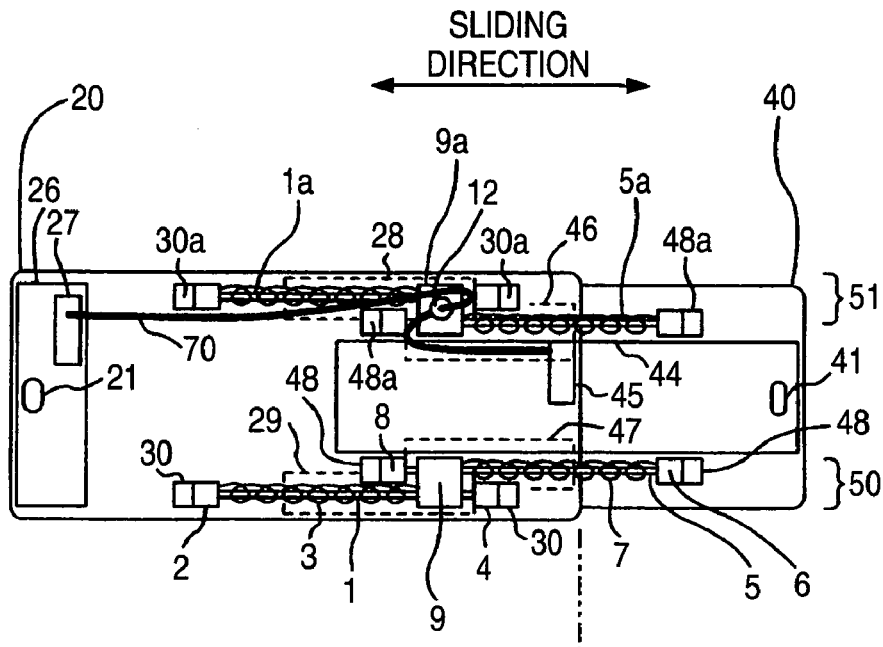
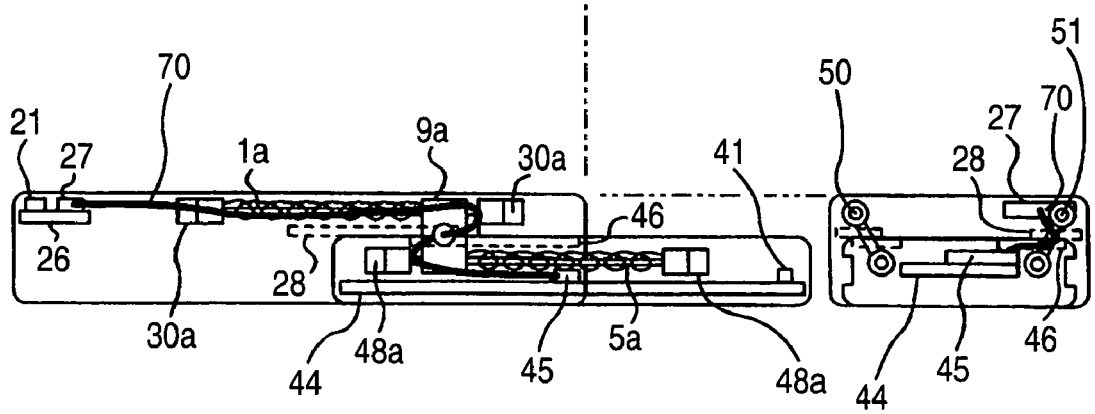
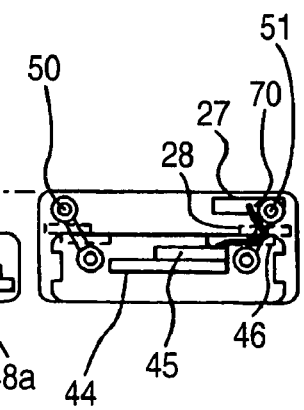

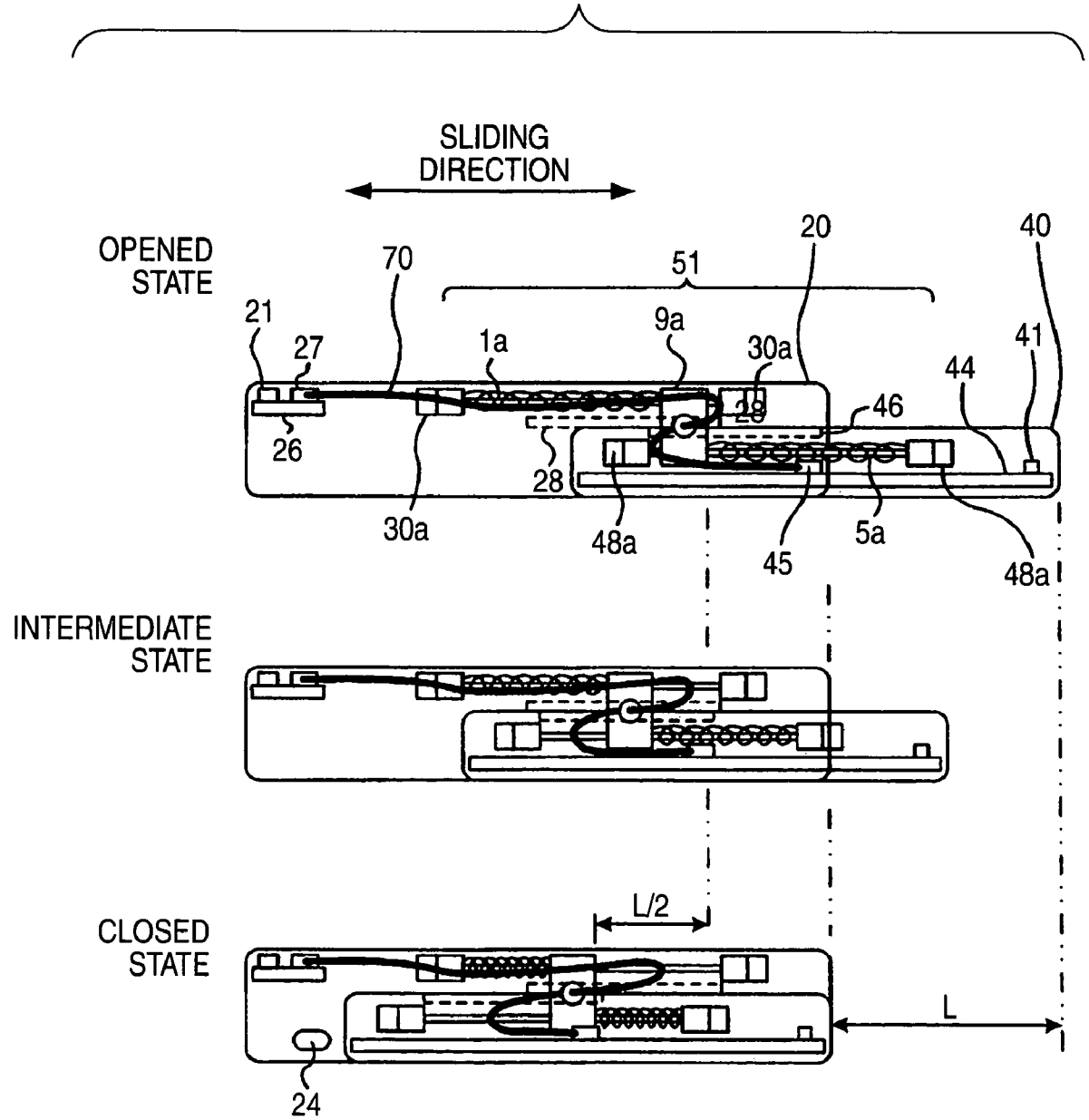

SLIDING MECHANISM FOR PORTABLE ELECTRONIC DEVICE

RELATED APPLICATION(S)

The present disclosure relates to the subject matters contained in Japanese Patent Application No. 2007-317508 filed on Dec. 7, 2007, which are incorporated herein by reference in its entirety.

FIELD

The present invention relates to a sliding mechanism and a portable electronic device having the sliding mechanism that is reduced in size, the sliding mechanism being provided with a connection cable arranged to connect first and second case 40 of the portable electronic device while allowing the first and second case 40 to slide with each other.

BACKGROUND

A cellular phone having a sliding mechanism that is reduced in size is disclosed in JP-A-2006-333079. The sliding mechanism disclosed in JP-A-2006-333079 is configured that an actuator slides over a shaft. The sliding mechanism has a cylindrical spring is provided on the shaft and imparts resilient force to sliding action of the actuator. The shaft of the sliding mechanism is mounted to a frame of an upper case of the cellular phone, and the actuator of the sliding mechanism is attached to a lower case, whereby the upper case and the lower case slide with each other. The frame needs to have a space to allow the spring and the actuator to slide.

Another example of such sliding mechanism for a portable equipment is disclosed in JP-A-2006-245347. The sliding mechanism disclosed in JP-A-2006-245347 has a configuration similar to that disclosed in JP-A-2006-333079.

An example of a cellular phone having a sliding mechanism provided with a flexible substrate as a connection cable between upper and lower cases is disclosed in JP-A-2006-128808. In the sliding mechanism disclosed in JP-A-2006-128808, a bent portion of the flexible substrate moves within the case in conjunction with the sliding action.

An example of a cellular phone having a sliding mechanism provided with a lead wire as a connection cable between upper and lower cases is disclosed in JP-A-2005-167309. In the configuration disclosed in JP-A-2005-167309, the connection cable located between upper and lower cases is a wire having a sheath made of resin and 30 lead wires being bundled together. A coil spring is used for a spring for urging purpose that slides the upper and lower cases. The connection cable is disposed in a space within the coil spring and bents in accordance with expansion and contraction of the coil spring to be extended and shortened.

In the sliding mechanism disclosed in JP-A-2006-333079, a slidable distance becomes essentially equal to the length of the shaft. Therefore, in order to acquire a desired slide distance, the length of the shaft needs to be increased, and a frame to which the shaft is to be attached also becomes longer. Hence, there is a problem of a structural limitation being imposed on the upper case on which the frame is mounted. The configuration disclosed in JP-A-2006-245347 also has a similar problem.

The flexible substrate disclosed in JP-A-2006-128808 is generally formed to be wide, and a bent portion of the substrate is movable in the case. Hence, the movable space needs to be ensured in the case, and there is a problem of difficulty being encountered in designing the case to be small in size. The flexible substrate needs to be movable by an amount corresponding to the slide distance of the case, and a certain degree of high rigidity is required. A lead wire having low rigidity, or the like, has a problem in allowing the lead wire to be extended and shortened in the case by bending the lead wire.

The configurations disclosed in JP-A-2006-128808 and in JP-A-2005-167306 have a problem of difficulty being encountered in smoothly inserting or withdrawing the connection cable in or from a narrow space in the coil spring that expands or contracts in accordance with the slide distance of the case without being stuck therein.

SUMMARY

According to a first aspect of the invention, there is provided a sliding mechanism for a portable electronic device having a first case and a second case that faces the first case, the sliding mechanism including: a slidable intermediate member having first and second guide holes that are provided to be in parallel with each other; a first shaft that is slidably inserted into the first guide hole, the first shaft having first and second end portions that are to be attached to the first case; a first spring member that is interposed between the first end portion of the first shaft and the slidable intermediate member to urge the slidable intermediate member toward the second end portion of the first shaft; a second shaft that is slidably inserted into the second guide hole, the second shaft having third and fourth end portions that are to be attached to the second case, the third end portion being disposed at a position opposite to a position where the first end portion is disposed; and a second spring member that is interposed between the third end portion of the second shaft and the slidable intermediate member to urge the slidable intermediate member toward the fourth end portion of the second shaft.

According to a second aspect of the invention, there is provided a portable electronic device including: a first case; a second case that faces the first case; and a sliding mechanism including: a slidable intermediate member having first and second guide holes that are provided to be in parallel with each other; a first shaft that is slidably inserted into the first guide hole, the first shaft having first and second end portions that are attached to the first case; a first spring member that is interposed between the first end portion of the first shaft and the slidable intermediate member to urge the slidable intermediate member toward the second end portion of the first shaft; a second shaft that is slidably inserted into the second guide hole, the second shaft having third and fourth end portions that are attached to the second case, the third end portion being disposed at a position opposite to a position where the first end portion is disposed; and a second spring member that is interposed between the third end portion of the second shaft and the slidable intermediate member to urge the slidable intermediate member toward the fourth end portion of the second shaft.

According to a third aspect of the invention, there is provided a portable electronic device including: a first case; a second case that faces the first case; a first sliding mechanism; and a second sliding mechanism, wherein the first sliding mechanism includes: a first slidable intermediate member having first and second guide holes that are provided to be in parallel with each other; a first shaft that is slidably inserted into the first guide hole, the first shaft having first and second end portions that are attached to the first case; a first spring member that is interposed between the first end portion of the first shaft and the first slidable intermediate member to urge the first slidable intermediate member toward the second end portion of the first shaft; a second shaft that is slidably inserted into the second guide hole, the second shaft having third and fourth end portions that are attached to the second case, the third end portion being disposed at a position opposite to a position where the first end portion is disposed; and a second spring member that is interposed between the third end portion of the second shaft and the first slidable intermediate member to urge the first slidable intermediate member toward the fourth end portion of the second shaft, and wherein the second sliding mechanism includes: a second slidable intermediate member having third and fourth guide holes that are provided to be in parallel with each other; a third shaft that is slidably inserted into the third guide hole, the third shaft having fifth and sixth end portions that are attached to the first case; and a fourth shaft that is slidably inserted into the fourth guide hole, the fourth shaft having seventh and eighth end portions that are attached to the second case, the seventh end portion being disposed at a position opposite to a position where the fifth end portion is disposed.

BRIEF DESCRIPTION OF THE DRAWINGS

In the accompanying drawings:

FIG. 4 is a perspective drawing to show a front view, a side view, and a bottom view of a portable electronic device according to a second embodiment; and FIG. 5 is a perspective drawing to show a side view for describing an intermediate state of the portable electronic device according to the second embodiment.

DETAILED DESCRIPTION OF THE EMBODIMENTS

Embodiments of the present invention will be described with reference to the drawings.

Figure 1:
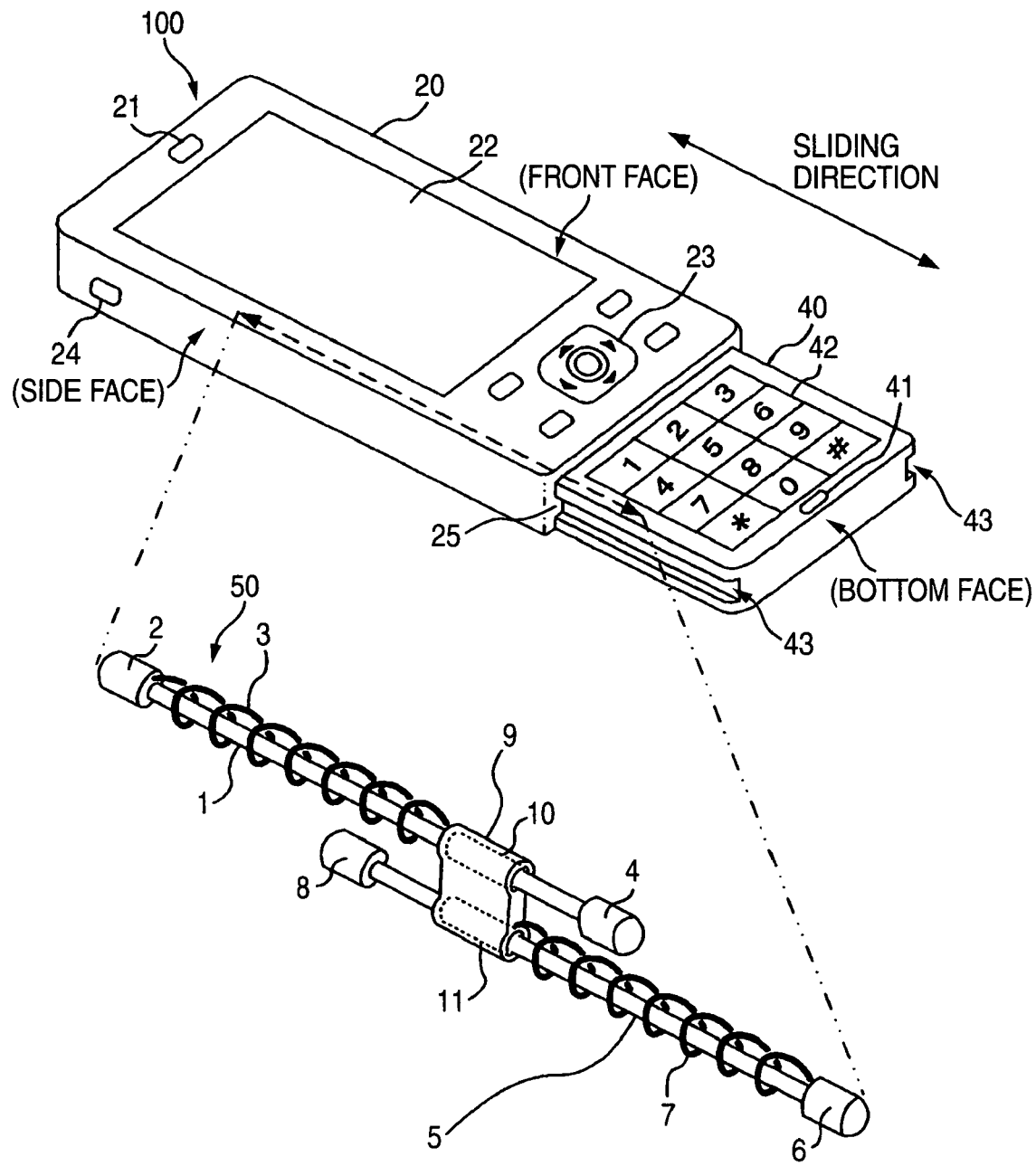
FIG. 1 is an external perspective view of a portable electronic device and a sliding mechanism according to the present invention.

FIG. 1 is an external perspective view of a portable electronic device and a sliding mechanism according to embodiments of the present invention, showing a state where first case 20 and the second case 40 are slidably opened. An upper part of FIG. 1 shows an external perspective view of a portable electronic device 100; and a lower part of FIG. 1 shows an external perspective view of a sliding mechanism 50. The sliding mechanism 50 is incorporated into a space in the portable electronic device 100 indicated by a dotted arrow. The portable electronic device 100 and the sliding mechanism respectively shown in the upper part and lower part of FIG. 1 differ from each other in terms of a scale.

The sliding mechanism 50 includes a first shaft 1, a first end cap (first end portion) 2, a first spring 3, a second end cap (second end portion) 4, a second shaft 5, a third end cap (third end portion) 6, a second spring 7, a fourth end cap (forth end portion) 8, a slidable intermediate member 9. The slidable intermediate member 9 is formed with a first guide hole 10 and a second guide hole 11, which are arranged to be in parallel with each other.

The first shaft 1 is inserted into the first spring 3 and the first guide hole 10, and both ends of the first shaft 1 are fixed by the first end cap 2 and the second end cap 4, respectively. The second shaft 5 is inserted into the second spring 7 and the second guide hole 11, and both ends of the second shaft are fixed by the third end cap 6 and the fourth end cap 8. The first shaft 1 and the second shaft 5 are equal in length.

The first spring 3 and the second spring 7 are coil springs that generate urging force in a direction of extension. Therefore, in the sliding mechanism 50, the first shaft 1 and the second shaft 5 slide with each other through the intervention of the slidable intermediate member 9 in a direction where the first end cap 2 and the third end cap 6 separate from each other. The first spring 4 and the second spring 5 are identical with each other in terms of a shape and strength.

The first end cap 2 and the second end cap 4 of the sliding mechanism 50 are attached to the first case 20 of the portable electronic device 100. The third end cap 6 and the fourth end cap 8 are fixedly attached to the second case 40. Therefore, the sliding mechanism 50 imparts urging force by means of which the first case 20 and the second case 40 of the portable electronic device 100 slide each other.

A shock-absorbing member for absorbing an impact resulting from sliding action induced by urging force is provided between the slidable intermediate member 9 and the second end cap 4 so as to fit around the first shaft 1 and between the slidable intermediate member 9 and the fourth end cap 8 so as to fit around the second shaft 5. The shock-absorbing member is not shown in the drawings.

The portable electronic device 100 has a structure in which the first case 20 enwraps the second case 40. A guide projection 25 of the first case 20 and a guide groove 43 of the second case 40 are provided in a sliding direction from a bottom surface of the portable electronic device. The guide projection 25 and the guide groove 43 engage with each other to allow the first case 20 and the second case 40 to slide.

A speaker 21, a display section 22, and a multifunction key 23 are provided on a front face of the first case 20. A lock key 24 is provided on side faces of the first case 20. A microphone 41, and a ten-key 42 are provided on a front face of the second case 40.

When the user slides the second case 40 toward the first case 20 against urging force of the sliding mechanism 50 and presses the second case 40 to the end, the first case 20 and the second case 40 are locked together in a closed state by means of an internal lock mechanism (not shown). When the user pressed the lock key 24 while holding the first case 20 in the hand, the lock mechanism is released, whereupon the second case 40 projects by means of the urging force of the sliding mechanism 50, to thus become an opened state shown in FIG. 1.

First Embodiment

A detailed structure of the portable electronic device 100 will now be described. A first embodiment is an example where single set of the sliding mechanism 50 is provided.

Figure 2:
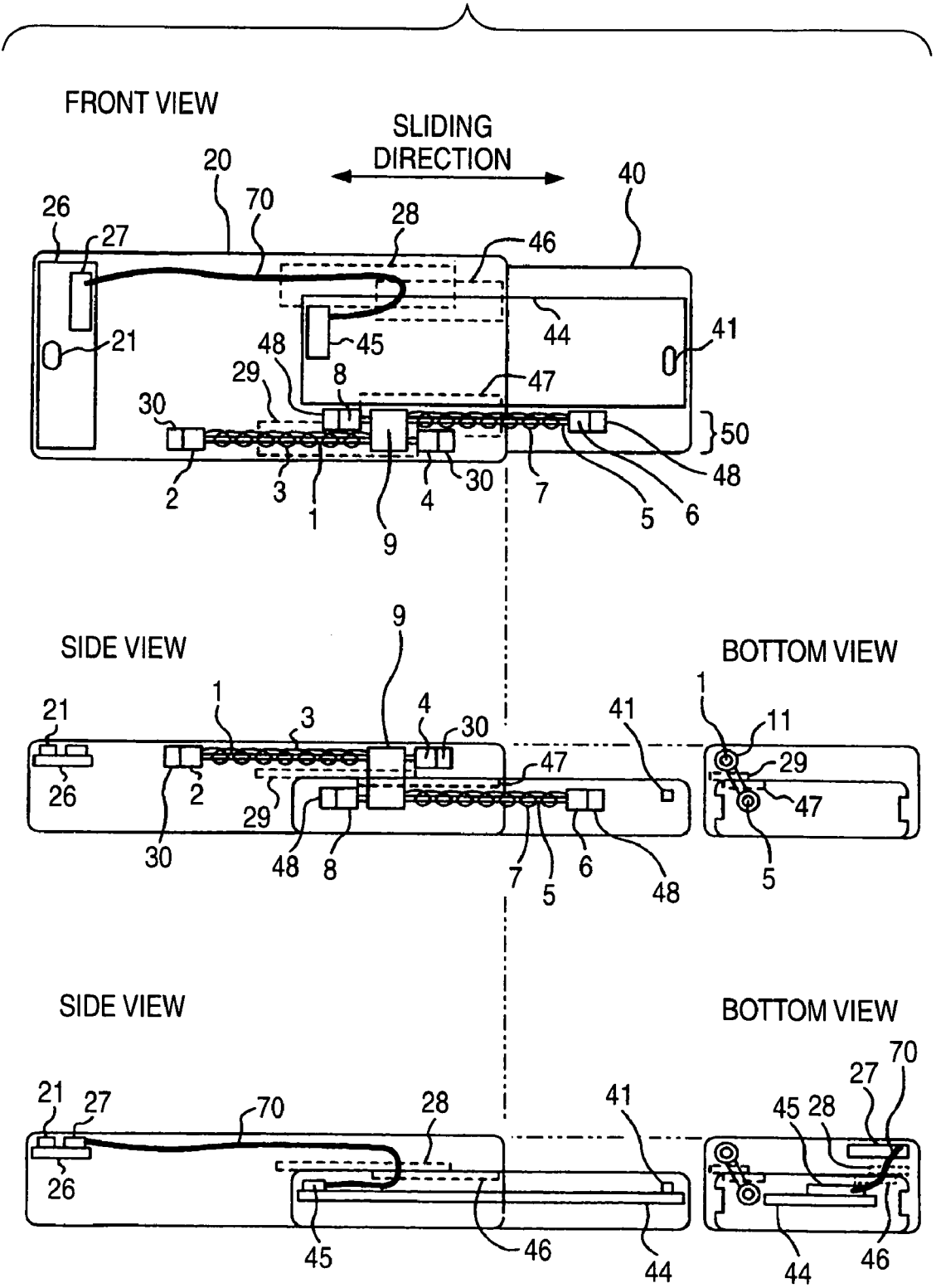
FIG. 2 is a perspective drawing to show a front view, a side view, and a bottom view of the portable electronic device according to a first embodiment of the present invention.

FIG. 2 is a perspective view of a front view, a side view, and a bottom view of the portable electronic device of the first embodiment of the present invention in an opened state. The drawing shows that the portable electronic device is opened and remains stable by means of urging force of the sliding mechanism 50. The topmost section of FIG. 2 shows a front view. In order to make explanations easy to comprehend, sections associated with the sliding mechanism 50 and the cable 70 are shown in a perspective manner. The right part in the middle section of FIG. 2 shows a side view, and the right part of the middle section of FIG. 2 shows a bottom view. Since difficulty is encountered in providing an explanation when the sliding mechanism 50 and the cable 70 overlap each other when viewed from the side. Hence, sections associated with the sliding mechanism 50 are provided in a perspective manner. The left part of the bottom section of FIG. 2 shows a side view, and right part of the bottom section of FIG. 2 shows a bottom view. Sections associated with the cable 70 are shown in a perspective manner.

Members to be provided on the first case 20, except the sliding mechanism 50 and the cable 70, are denoted by the numbers of twenties and thirties. Members to be provided on the second case 40 are denoted by the numbers of forties.

In addition to the members shown in FIG. 1, the first case 20 has a first circuit board 26, a connector 27, a first window 28, a second window 29, and first attachment parts 30. In addition to including the members shown in FIG. 1, the second case 40 has a second circuit board 44, a connector 45, a third window 46, a fourth window 47, and second attachment parts 48.

The first end cap 2 and the second end cap 4 of the first shaft 1 of the sliding mechanism 50 are attached to the (two) first attachment parts 30 of the first case 20. The (two) first attachment parts 30 are structured such that the first end cap 2 and the second end cap 4 are fitted into the respective first attachment parts.

The third end cap 6 and the fourth end cap 8 of the second shaft 5 of the sliding mechanism 50 are attached to the (two) second attachment parts 48 of the second case 40. The (two) second attachment parts 48 are structured such that the third end cap 6 and the fourth end cap 8 are fitted into the respective second attachment parts.

The second window 29 and the fourth window 47 are spaces for the slidable intermediate member 9 that runs through the first case 20 and the second case 40. A distance for movement of the slidable intermediate member 9 that moves in association with sliding action is assured in a sliding direction.

As a result, the sliding mechanism 50 imparts urging force to the first case 20 and the second case 40, whereupon the first case 20 and the second case 40 can freely perform sliding motion.

The cable 70 includes several tens of fine coaxial wires being bound with one another. The cable 70 is used for connection of an electrical signal between the first case 20 and the second case 40 that perform sliding motions. The cable 70 has a characteristic having superior noise resistance and flexibility. The respective ends of the cable 70 are connected to the connector 27 and the connector 45.

The speaker 21, the connector 27, and a camera imaging unit (not shown) are mounted on the first circuit board 26. The first circuit board 26 is provided with connectors (not shown) connected to the display section 22 and the multifunction key 23 (FIG. 1). The microphone 41, the ten-key 42, the connector 45, and a controller (not shown), such as a CPU, are mounted on the second circuit board 44.

The first window 28 and the third window 46 are spaces for the cable 70 that runs through the first case 20 and the second case 40. A distance for movement of the cable 70 that moves in association with sliding action is assured in a sliding direction.

Figure 3:
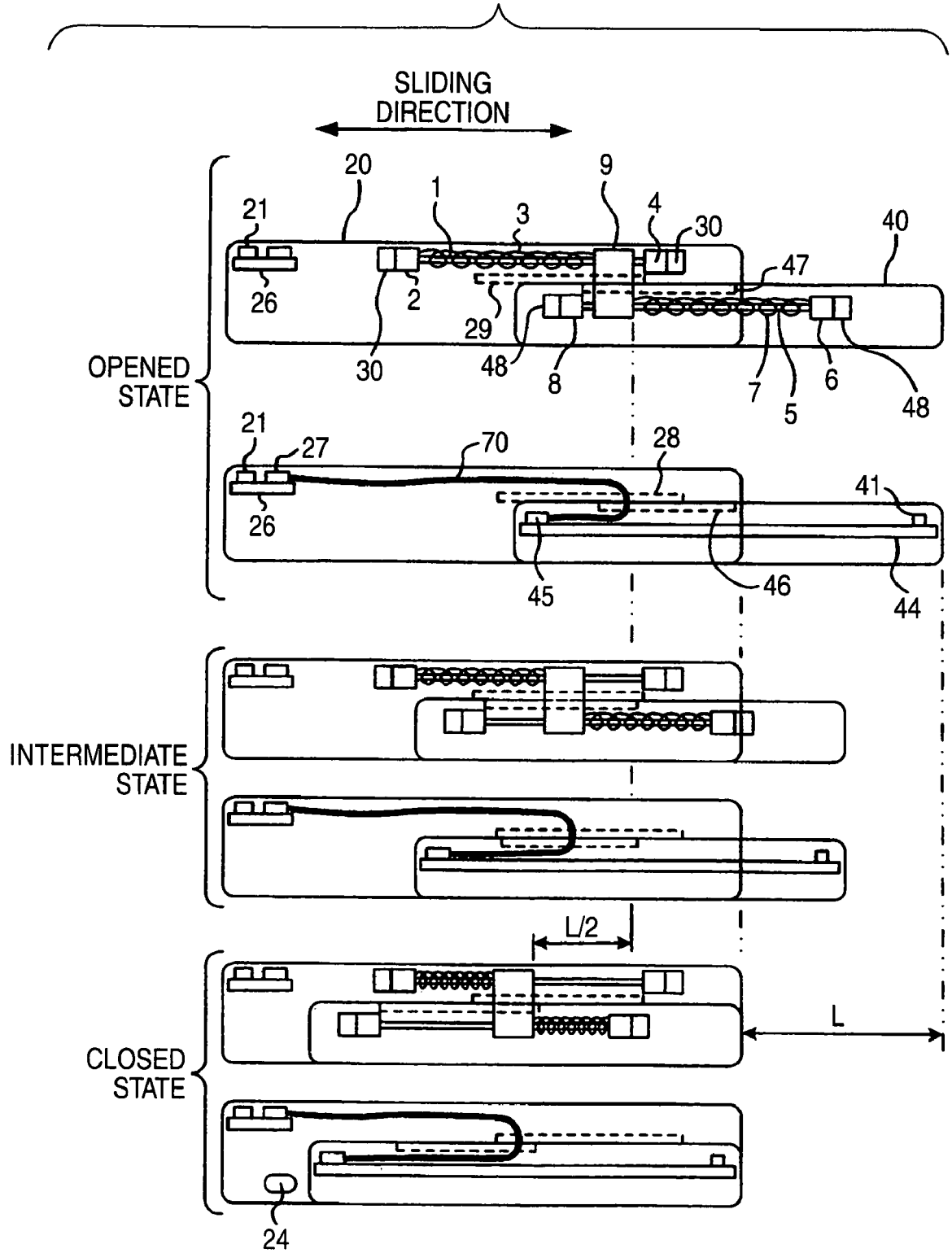
FIG. 3 is perspective drawing to show side views for describing an intermediate state of the portable electronic device according to the first embodiment.

FIG. 3 is a perspective side view of the portable electronic device of the first embodiment in an intermediate state of the slide action. The upper section of FIG. 3 shows a stable state where the cases of the portable electronic device are opened after having slid by the urging force of the sliding mechanism 50. The upper section of FIG. 3 separately shows a perspective view of an associated section of the sliding mechanism 50 and a perspective view of an associated section of the cable 70, as such shown in FIG. 2. The middle section of FIG. 3 shows a state between an opened state and a closed state, and the slide section does not automatically stay in this state. The bottom section of FIG. 3 shows a stable state where the sliding mechanism is locked by a lock mechanism (not shown) after having slid and become closed.

In the opened state shown in the upper section of FIG. 3, the first case 20 and the second case 40 remain stable after slid in an opening direction by the urging force exerted in the direction of extension of the first spring 3 and the second spring 7. In this state, the user slides the second case 40 toward the first case 20 against the urging force of the sliding mechanism 50 and presses the second case 40 into the first case 20. When the second case 40 is pushed into the end after having passed through an intermediate state shown in the middle section of FIG. 3, the first case 20 and the second case 40 transition into a closed state as shown in the bottom section of FIG. 3. In this state, the first case 20 and the second case 40 are directly locked together by means of an internal lock mechanism (not shown) and become stable in a closed state.

In a closed state shown in the bottom section of FIG. 3, when the user pressed the lock key 24 while holding the first case 20 in the hand, the lock mechanism is released, whereupon the second case 40 projects by the urging force of the sliding mechanism 50 exerted in the extending direction. After having passed through the intermediate state shown in FIG. 3B, the second case 40 becomes stable in the opened state shown in the upper section of FIG. 3.

Operation of the slidable intermediate member 9 will now be described. Since the first spring 3 and the second spring 7 are identical with each other in terms of strength and shape, the slidable intermediate member 9 slides so as to stop at an essentially-intermediate position between the first end cap 2 and the third end cap 6 in any of the states shown in FIG. 3.

A distance over which the second case 40 slides with respect to the first case 20 is indicated by L in the drawing. In contrast, a distance over which the slidable intermediate member 9 slides in the first case 20 with respect to the first case 20 is indicated by L/2 in the drawing. Although unillustrated as a distance, the distance over which the slidable intermediate member 9 slides in the second case 40 with respect to the second case 40 is also indicated by the same reference numeral L/2.

Specifically, in contrast with the slide distance L between the first case 20 and the second case 40, ensuring the slide distance L/2 of the slidable intermediate member 9 in each of the first case 20 and the second case 40 is the minimum requirement. Specifically, the essential requirement is that each of the first case 20 and the second case 40 should share one-half the slide distance.

Motion of the cable 70 will be described. The connector 45 moves over the distance L with respect to the connector 27 at one end of the cable 70. However, the cable 70 assumes a U-turn shape, and hence the movable distance of the U-turn portion requires only one-half of the distance L; namely, L/2. The minimum requirement for the cable 70 is to have a length in the sliding direction over which the cable 70 can move as illustrated and over which the first window 28 and the third window 46 can respond to movement of the U-turn portion of the cable 70.

According to the first embodiment, two short shafts, such as the first shaft 1 and the second shaft 5, are provided when compared with a conventional case of one shaft. The respective shafts are attached in a dispersed manner to the first case 20 and the second case 40, whereby even the short shafts can provide a comparatively-long slide distance.

The slide distance of the slidable intermediate member 9 in the respective cases is also dispersed between the cases. The distances of the windows 29 and 47 achieved in the sliding direction for ensuring the movable area can also be shortened and dispersed between the respective cases. Structural constraints on the respective cases and constraints on the cable wire between the cases can also be dispersed. Since the distances of the windows achieved in the sliding direction can be shortened, exposure of the window to the outside can be prevented.

The first spring 3 and the second spring 7 are springs that generate urging force in the direction of extension. However, they may also be embodied as springs that generate urging force in the direction of contraction; the first spring 3 may be provided between the second end cap 4 of the first shaft 1 and the slidable intermediate member 9; and both ends of the first spring 3 may be fixed to them. The second spring 7 may also be provided between the fourth end cap 8 of the second shaft 5 and the slidable intermediate member 9, and both ends of the second spring 7 may be fixed to them. Alternatively, a spring generating urging force in the direction of extension and a spring generating urging force in the direction of contraction may also be combined together.

Second Embodiment

FIG. 4 is a perspective drawing showing a front view, a side view, and a bottom view of the portable electronic device according to the second embodiment of the present invention in an opened state. A difference between the first and second embodiments lies in that two sets of sliding mechanisms; namely, the first sliding mechanism 50 and a second sliding mechanism 51, are provided and that the second sliding mechanism 51 is provided integrally with the cable 70. The upper section in FIG. 4 shows a front view of the portable electronic device. In order to make explanations easy to comprehend, sections associated with the first sliding mechanism 50, the second sliding mechanism 51, and the cable 70 are shown in a perspective manner in FIG. 4.

The left part of the bottom section in FIG. 4 shows a side view, and the right part of the bottom section in FIG. 4 shows a bottom view, thereby showing sections associated with the second sliding mechanism 51 and the cable 70 in a perspective manner. In the side view, the fourth shaft 5a and the second circuit board 44 overlap each other. In order to make explanations easy to comprehend, the second circuit board 44 is drawn as being shifted intentionally. The side view of the first sliding mechanism 50 is identical with that of the first embodiment, and illustration of the side view is omitted. Elements which are the same as those of the first embodiment are assigned the same reference numerals, and their explanations are omitted. Differences between the embodiments will be described hereunder.

The portable electronic device according to the second embodiment is provided with the second sliding mechanism 51 in addition to the configuration of the first embodiment. The second sliding mechanism 51 is identical in structure with the first sliding mechanism 50, and both end caps of the third shaft 1a are fixedly fitted into (two) third attachment parts 30a of the first case 20. Both ends of the fourth shaft 5a are fixedly fitted into (two) fourth attachment parts 48a of the second case 40.

A hole 12 into which an intermediate portion of the cable 70 is passed and fixed is formed in a slidable intermediate member 9a. The intermediate portion of the cable 70 moves along with movement of the slidable intermediate member 9a. The connector 45 connected to one end of the cable 70 is placed at a position differing from that in the first embodiment. The cable 70 is arranged to be in the shape of an S.

The first window 28 and the third window 46 are spaces for the slidable intermediate member 9a that runs through the first case 20 and the second case 40. A distance for movement of the slidable intermediate member 9a that moves in association with sliding action is assured in a sliding direction. Further, the windows 28 and 46 double also as spaces for the cable 70 that run through the first case 20 and the second case 40. A distance for movement of the cable 70 that moves in association with sliding action is assured in the sliding direction.

Since two sets of sliding mechanisms are provided, the strength required to each of the springs is only one-half of that required in the first embodiment, and hence the springs can be reduced in size.

An intermediate state of the portable electronic device will now be described.

FIG. 5 is a perspective drawing showing the side view for explaining an intermediate state of the portable electronic device according to the second embodiment. The first sliding mechanism 50 is identical with its counterpart of the first embodiment and hence omitted from the illustrative descriptions. The upper section in FIG. 5 is identical with the left part of the bottom section in FIG. 4, showing a stable state where cases of the portable electronic device are slid and opened by means of the urging force of the first sliding mechanism 50 and the second slid mechanism 51. The middle section in FIG. 5 shows an intermediate state achieved between an opened state and a closed state, and the cases do not automatically stay in this state. The bottom section in FIG. 5 shows a stable state where the sliding mechanisms are locked by a lock mechanism after having slid and become closed (not shown).

Operation of the second sliding mechanism 51 is identical with that of the side mechanism 50 of the first embodiment, and its explanation is omitted.

Movement of the cable 70 will be described. The hole (a stationary point provided at substantially intermediate position on the cable 70) of the slidable intermediate member 9a moves over a distance L/2 with respect to the connector 27 provided at one end of the cable 70. Therefore, a distance over which a U-turn portion of the cable 70 on the side of the first case 20 moves is only one-half of L/4. Likewise, a distance over which a U-turn portion of the cable 70 on the side of the second case 40 moves is only L/4. Namely, the minimum requirement for the cable 70 is to have a length in the sliding direction over which the cable 70 can move as illustrated and over which the first window 28 and the third window 46 can respond to movement of the U-turn portion of the cable 70.

Although the cable 70 is provided integrally on the second sliding mechanism 51, the cable 70 may also be provided integrally on the first sliding mechanism 50.

According to the second embodiment, there is obtained the same advantage as that obtained by the first embodiment, and the moving distance of the cable 70 can be shortened. A cable having rigidity that is comparatively lower than that of a flexible cable can also be used as the cable, as in the case of a fine coaxial wire.

As another embodiment, the first sliding mechanism 50 may be omitted from the configuration of the second embodiment, to thus realize only an integrated structure having the second sliding mechanism 51 and the cable 70. As a result, the number of windows can be reduced.

Alternatively, the spring of the second sliding mechanism 51 may also be deleted from the structure of the second embodiment, to thus cause the second sliding mechanism 51 to serve as a guide mechanism not generating urging force. In that case, the slidable intermediate member 9a is not forced to the intermediate position on the second sliding mechanism 51 by the spring. Hence, the integrated structure consisting of the cable 70 is abandoned, and a custom-designed window may also be provided as in the first embodiment.

It is to be understood that the invention is not limited to the specific embodiment described above and that the present invention can be embodied with the components modified without departing from the spirit and scope of the present invention. The present invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A sliding mechanism for a portable electronic device having a first case and a second case that faces the first case, the sliding mechanism comprising:
   a slidable intermediate member having first and second guide holes that are provided to be in parallel with each other;
   a first shaft that is slidably inserted into the first guide hole, the first shaft having first and second end portions that are to be attached to the first case;
   a first spring member that is interposed between the first end portion of the first shaft and the slidable intermediate member to urge the slidable intermediate member toward the second end portion of the first shaft;
   a second shaft that is slidably inserted into the second guide hole, the second shaft having third and fourth end portions that are to be attached to the second case, the third end portion being disposed at a position opposite to a position where the first end portion is disposed; and
   a second spring member that is interposed between the third end portion of the second shaft and the slidable intermediate member to urge the slidable intermediate member toward the fourth end portion of the second shaft.

2. A portable electronic device comprising:
   a first case;
   a second case that faces the first case; and
   a sliding mechanism including:
      a slidable intermediate member having first and second guide holes that are provided to be in parallel with each other;
      a first shaft that is slidably inserted into the first guide hole, the first shaft having first and second end portions that are attached to the first case;
      a first spring member that is interposed between the first end portion of the first shaft and the slidable intermediate member to urge the slidable intermediate member toward the second end portion of the first shaft;
      a second shaft that is slidably inserted into the second guide hole, the second shaft having third and fourth end portions that are attached to the second case, the third end portion being disposed at a position opposite to a position where the first end portion is disposed; and
      a second spring member that is interposed between the third end portion of the second shaft and the slidable intermediate member to urge the slidable intermediate member toward the fourth end portion of the second shaft.

3. The device according to claim 2 further comprising:
   a first circuit board that is housed in the first case;
   a second circuit board that is housed in the second case; and
   a connection cable that is connected to the first and second circuit boards at both ends thereof, the connection cable being fixed to the slidable intermediate member at an intermediate portion thereof,
   wherein the first case is provided with first attachment parts to which the first and second end portions are attached, and
   wherein the second case is provided with second attachment parts to which the third and fourth end portions are attached.

4. The device according to claim 3, wherein the connection cable has a plurality of fine coaxial wires being bound together.

5. A portable electronic device comprising:
   a first case;
   a second case that faces the first case;
   a first sliding mechanism; and
   a second sliding mechanism,
   wherein the first sliding mechanism includes:
      a first slidable intermediate member having first and second guide holes that are provided to be in parallel with each other;
      a first shaft that is slidably inserted into the first guide hole, the first shaft having first and second end portions that are attached to the first case;
      a first spring member that is interposed between the first end portion of the first shaft and the first slidable intermediate member to urge the first slidable intermediate member toward the second end portion of the first shaft;
      a second shaft that is slidably inserted into the second guide hole, the second shaft having third and fourth end portions that are attached to the second case, the third end portion being disposed at a position opposite to a position where the first end portion is disposed; and
      a second spring member that is interposed between the third end portion of the second shaft and the first slidable intermediate member to urge the first slidable intermediate member toward the fourth end portion of the second shaft, and
   wherein the second sliding mechanism includes:
      a second slidable intermediate member having third and fourth guide holes that are provided to be in parallel with each other;
      a third shaft that is slidably inserted into the third guide hole, the third shaft having fifth and sixth end portions that are attached to the first case; and
      a fourth shaft that is slidably inserted into the fourth guide hole, the fourth shaft having seventh and eighth end portions that are attached to the second case, the seventh end portion being disposed at a position opposite to a position where the fifth end portion is disposed.

* * * * *